(12) United States Patent
Sakamoto

(10) Patent No.: US 7,224,996 B2
(45) Date of Patent: May 29, 2007

(54) MOBILE INFORMATION DEVICE, METHOD OF CONTROLLING MOBILE INFORMATION DEVICE, AND PROGRAM

(75) Inventor: Masayoshi Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 449 days.

(21) Appl. No.: 10/365,393

(22) Filed: Feb. 13, 2003

(65) Prior Publication Data
US 2004/0204016 A1    Oct. 14, 2004

(30) Foreign Application Priority Data
Jun. 21, 2002    (JP)    ............... 2002-181871

(51) Int. Cl.
*H04M 1/00*    (2006.01)
(52) U.S. Cl. .............. 455/552.1; 455/550.1; 455/573; 455/572; 455/575.3; 455/574; 455/466; 382/315; 382/186
(58) Field of Classification Search ........... 455/552.1, 455/572, 575.3, 67.13, 466, 423, 573, 63.4, 455/574, 550, 575.1; 379/388.02; 45/67.16
See application file for complete search history.

(56) References Cited

U.S. PATENT DOCUMENTS

| | | | |
|---|---|---|---|
| 5,881,377 A | | 3/1999 | Giel et al. |
| 5,884,156 A | * | 3/1999 | Gordon ................ 455/321 |
| 6,002,763 A | * | 12/1999 | Lester et al. ............ 379/421 |
| 6,002,928 A | * | 12/1999 | Yoon et al. ............. 455/423 |
| 6,035,191 A | * | 3/2000 | Moore .................. 455/418 |
| 6,044,266 A | * | 3/2000 | Kato ................... 455/422.1 |
| 6,052,565 A | * | 4/2000 | Ishikura et al. .......... 455/67.11 |
| 6,052,572 A | * | 4/2000 | Imura .................. 455/343.5 |
| 6,058,316 A | * | 5/2000 | Takahashi ............. 455/552.1 |
| 6,154,525 A | * | 11/2000 | Formosa ................ 379/42 |
| 6,192,258 B1 | * | 2/2001 | Kamada et al. ......... 455/566 |
| 6,246,862 B1 | * | 6/2001 | Grivas et al. ........... 455/566 |
| 6,292,674 B1 | | 9/2001 | Davis .................. 455/550 |
| 6,330,457 B1 | * | 12/2001 | Yoon ................... 455/550.1 |
| 6,434,404 B1 | * | 8/2002 | Claxton et al. .......... 455/575.3 |
| 6,728,552 B2 | * | 4/2004 | Chatain ................ 455/556.1 |
| 6,813,344 B1 | * | 11/2004 | Lemke ................. 379/142.06 |

FOREIGN PATENT DOCUMENTS

CN    1170328 A    1/1998

(Continued)

OTHER PUBLICATIONS

Notice of Reason for Rejection issued in Japanese Patent Application No. 2002-181871 corresponding to the present above-identified pending US patent Application, dated Nov. 1, 2005, 2 pages, including English translation thereof 3 pages.

(Continued)

*Primary Examiner*—Marceau Milord
(74) *Attorney, Agent, or Firm*—Staas & Halsey LLP

(57) ABSTRACT

A mobile information device has an operation unit which detects an operation by a user, a detection unit which detects a predetermined state when operated by the user, and a control unit which validates or invalidates the operation of the operation unit, depending on whether the predetermined state is detected or not.

16 Claims, 12 Drawing Sheets

FOREIGN PATENT DOCUMENTS

| | | |
|---|---|---|
| CN | 1311941 A | 9/2001 |
| EP | 0 865 167 A2 | 9/1998 |
| EP | 1 085 731 A2 | 3/2001 |
| EP | 0 865 167 A3 | 9/2003 |
| EP | 1 085 731 A3 | 1/2004 |
| GB | 2 314 739 A | 7/1998 |
| JP | 05-143551 | 6/1993 |
| JP | 06-004183 | 1/1994 |
| JP | 3001075 | 6/1994 |
| JP | 09-212462 | 8/1997 |
| JP | 10-94060 | 4/1998 |
| JP | 10-124250 | 5/1998 |
| JP | 10-190786 | 7/1998 |
| JP | 2002-171314 | 6/2002 |

OTHER PUBLICATIONS

Office Action issued by SIPO dated Dec. 3, 2004 with regard to the corresponding Chinese Patent Application No. 03119454.0.
European Search Report dated Feb. 4, 2005.
Final Decision of Rejection, issued May 16, 2006 in the Japanese Patent Application No. 2002-181871 that corresponds to the present above-identified U.S. patent application (2 pages), including English translation thereof (3 pages).
Office Action dated Jun. 10, 2005 with regard to the corresponding Chinese Patent Application No. 03119454.0.

* cited by examiner

MOBILE INFORMATION DEVICE, METHOD OF CONTROLLING MOBILE INFORMATION DEVICE, AND PROGRAM

BACKGROUND OF THE INVENTION

The present invention relates to a mobile information device.

A multiplicity of small-sized mobile information devices such as a mobile phone, an electronic note, a PDA (Personal Digital Assistant) or s small-sized personal computer etc, have been developed, sold and utilized. This type of mobile information device is operated by a built-in battery and can be utilized in places unable or difficult to ensure a power source on a commercial basis in conditions such as walking, the outdoors, a destination of excursion and so on.

An external configuration of such a mobile information device has dimensions that are as small as being insertable into a pocket of clothing, and a battery capacity thereof is limited. What is therefore demanded is a reduction in electricity consumption of the device for a long period of operation.

For attaining this, there is often adopted a function of decreasing the electricity consumption by stopping the operation if the user does not operate the device, or switching OFF a power source upon detecting no operation on a keyboard etc for a predetermined time.

In this type of device of the prior art, when detecting no user's operation for the predetermined time by monitoring the user's operation on an operation button, a touch panel etc, the control is executed in a way that cuts off the power source or extinguishes a liquid crystal back light etc for consuming the electricity.

Those mobile information devices are, however, small-sized and carried while being put into a bag or pocket in many cases. In such a state, it might happen that the operation button etc provided on the mobile information device is pressed by an external pressure with the result that a function corresponding to the pressed button is started up.

Further, there is proposed a device started up by pressing an operation button other than a power switch in order to enhance user-friendliness. For example, a mobile phone disclosed in Japanese Patent Application Laying-Open Publication No. 8-341946, is structured such that a handholding state of a device carrier (user) and a touched state of a user's own ear with the receiver are detected, and a supply of electricity from a battery to an LCD is stopped in such a state. In the state where the ear touches the receiver, the user does not see the LCD, and therefore this is because the electricity is saved.

Moreover, a technology of a wireless mouse disclosed in Japanese Patent Application Laying-Open Publication No. 10-124250 is that the power source is switched ON upon touching a sensor provided on an upper portion of the mouse with a hand and switched OFF when the hand separates therefrom.

In those devices, however, if the pressure is applied on the operation button etc inside the bag or pocket, the result is that the device works. Accordingly, the device results in working in cases other than the user's intention of operating, and there is a possibility of wastefully consuming the battery.

Furthermore, the scheme of immediately switching, as by the prior art, ON or OFF the power source depending on the contact state of the hand or ear etc, involves frequent switching of the power source in the normal mobile information device. Therefore, there might be a case where the operation of the user utilizing the mobile information device is interrupted, and the user-friendliness is extremely bad.

SUMMARY OF THE INVENTION

It is a primary object of the present invention, which was devised to obviate the problems inherent in the prior art described above, to provide a mobile information device capable of restraining an unnecessary action under a user does not intend to operate the device.

It is another object of the present invention to provide a mobile information device capable of ensuring user friendliness by restraining the unnecessary action of the device.

To accomplish the above objects, according to one aspect of the present invention, a mobile information device has an operation unit which detects an operation by a user, a detection unit which detects a predetermined state when operated by the user, and a control unit which validates or invalidates the operation of the operation unit, depending on whether the predetermined state is detected or not.

The predetermined state connotes herein, for instance, a state where the mobile information device can be actually utilized by the user, i.e., a state where the mobile information device is handheld by the user, and so on. The present mobile information device validates or invalidates the operation on the operation unit in accordance with whether the device is in such a predetermined state or not. Hence, the present mobile information device, even if the operation unit detects the user's operation when not actually in a usable state, invalidates the operation. This scheme restrains an unnecessary action on the mobile information device when not in the predetermined state.

According to another aspect of the present invention, a mobile information device has a power source, a detection unit which detects a predetermined state when operated by a user, and a control unit which controls such a transition point as to transit from a first state to a second state in accordance with whether the predetermined state is detected or not.

Thus, the present mobile information device controls the transition point, e.g., the power cut-off point, depending on whether in the predetermined state or not. For example, if the user does not operate the operation unit of the mobile information device for a predetermined period of time, the power source may be automatically cut off. Further, when the mobile information device is in the predetermined state, e.g., in the handholding state, the above predetermined time may be set longer than not in the predetermined state.

Preferably, the mobile information device may further have an operation unit which detects the operation by the user, and the control unit may cut off the power source when the operation unit does not detect the operation by the user for duration of a first period in the predetermined state, and may also cut off the power source when the operation unit does not detect the operation by the user for duration of a second period if not in the predetermined state.

According to still another aspect of the present invention, a mobile information device has a display unit capable of controlling brightness of a display, a detection unit which detects a predetermined state when operated by a user, and a control unit which controls the brightness of the display in accordance with whether the predetermined state is detected or not.

Thus, the present mobile information device controls the brightness of the display in accordance with whether in the predetermined state or not. For example, if the user does not operate the operation unit of the mobile information device for the predetermined time, the display may be darkened. Further, the above predetermined time may be set longer when the mobile information is in the handholding state than not in the handholding state. The brightness of the display is herein, for instance, a luminosity on a liquid crystal display, brightness of an electroluminescence panel, a luminosity of a CRT and so on.

Preferably, the control unit may control a period for keeping the brightness of the display in accordance with whether the predetermined state is detected or not.

Preferably, the mobile information device may further have an operation unit which detects an operation by a user, and the control unit may decrease the brightness of the display when the operation unit does not detect the operation by the user for duration of a first period in the predetermined state, and may also decrease the brightness of the display when the operation unit does not detect the operation by the user for duration of a second period if not in the predetermined state.

Preferably, the mobile information device may further have a display unit supplied with electricity from the power source, and the transition point may be a point of cutting off the power source to stop the electric supply to the display unit.

Preferably, the mobile information device may further have an operation unit which detects an operation by a user, and the control unit may stop the electric supply to the display unit when the operation unit does not detect the operation by the user for duration of a first period in the predetermined state, and may stop the electric supply to the display unit when the operation unit does not detect the operation by the user for duration of a second period if not in the predetermined state.

According to yet another aspect of the present invention, a mobile information device has a performance unit capable of controlling a performance speed, a detection unit which detects a predetermined state when operated by a user, and a control unit which controls the performance speed in accordance with whether the predetermined state is detected or not.

Thus, the present mobile information device controls the performance speed of the performance unit in accordance with whether in the predetermined state or not. For instance, if the user does not operate the operation unit of the mobile information device for the predetermined time, the performance speed may be decreased. Further, when the mobile information device is in the predetermined state, e.g., in the handholding state, the predetermined period of time may be set longer than not in the predetermined state. The performance speed is herein a clock cycle of a CPU or bus, an interval of executing a predetermined program, an interval of executing a predetermined process and so forth.

Preferably, the control unit may control a period of keeping the performance speed in accordance with whether the predetermined state is detected or not.

The mobile information device may further have an operation unit which detects an operation by a user, and the control unit may decrease the performance speed when the operation unit does not detect the operation by the user for duration of a first period in the predetermined state, and may decrease the performance speed when the operation unit does not detect the operation by the user for duration of a second period if not in the predetermined state.

According to a further aspect of the present invention, a mobile information device has a processing unit which executes one or more processing programs, a detection unit which detects a predetermined state when operated by a user, and a control unit which starts or terminates a specified processing program in the processing unit in accordance with whether the predetermined state is detected or not.

Preferably, the control unit may control such a keeping period as to keep an executed state or a stopped state of the processing program in accordance with whether the predetermined state is detected or not.

Preferably, the mobile information device may further have an operation unit which detects an operation by a user, and the control unit may start or terminate the processing process when the operation unit does not detect the operation by the user for duration of a first period in the predetermined state, and may start or terminate the processing program when the operation unit does not detect the operation by the user for duration of a second period if not in the predetermined state.

According to a still further aspect of the present invention, there is provided a method by which one of a computer and other devices and machines executes any one of the processes described above.

According to a yet further aspect of the present invention, there is provided a storage medium readable by a computer etc and recorded with a program for making one of the computer and other devices or machines actualize any one of the functions described above.

As explained above, according to the present invention, the mobile information device is capable of restraining the unnecessary action under the condition the user does not intend to operate. Further, according to the present invention, the unnecessary action of the mobile information device can be restrained, and besides the user friendliness can be ensured.

DETAILED DESCRIPTION OF THE PREFERRED EMBODIMENTS

Preferred embodiments of the present invention will hereinafter be described with reference to the accompanying drawings.

First Embodiment

A mobile information device in a first embodiment of the present invention will hereinafter be discussed referring to FIGS. 1 through 6.

Figure 1:
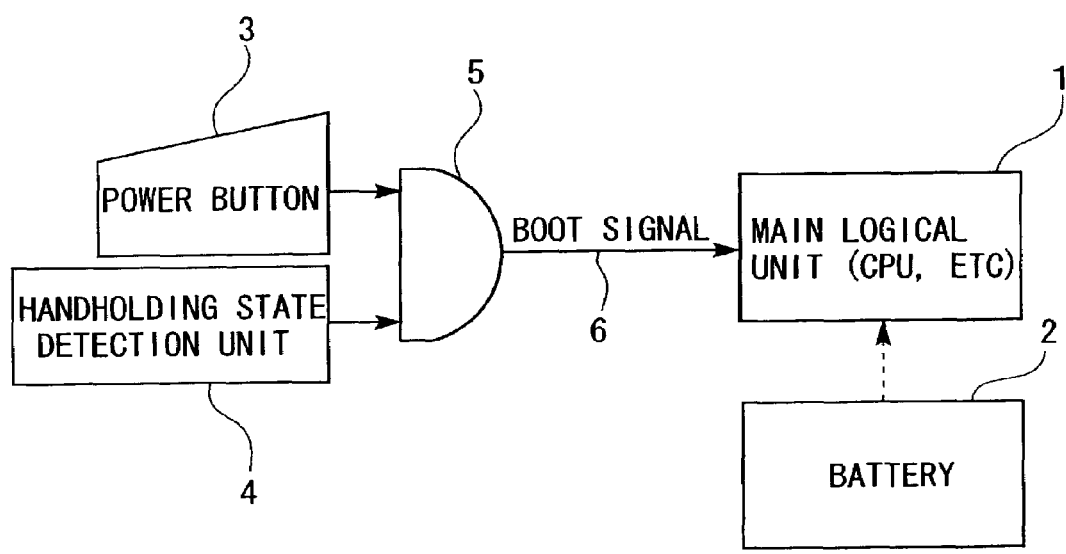
FIG. 1 is a block diagram showing a logical operation when starting up a mobile information device in a first embodiment of the present invention.
Figure 2:
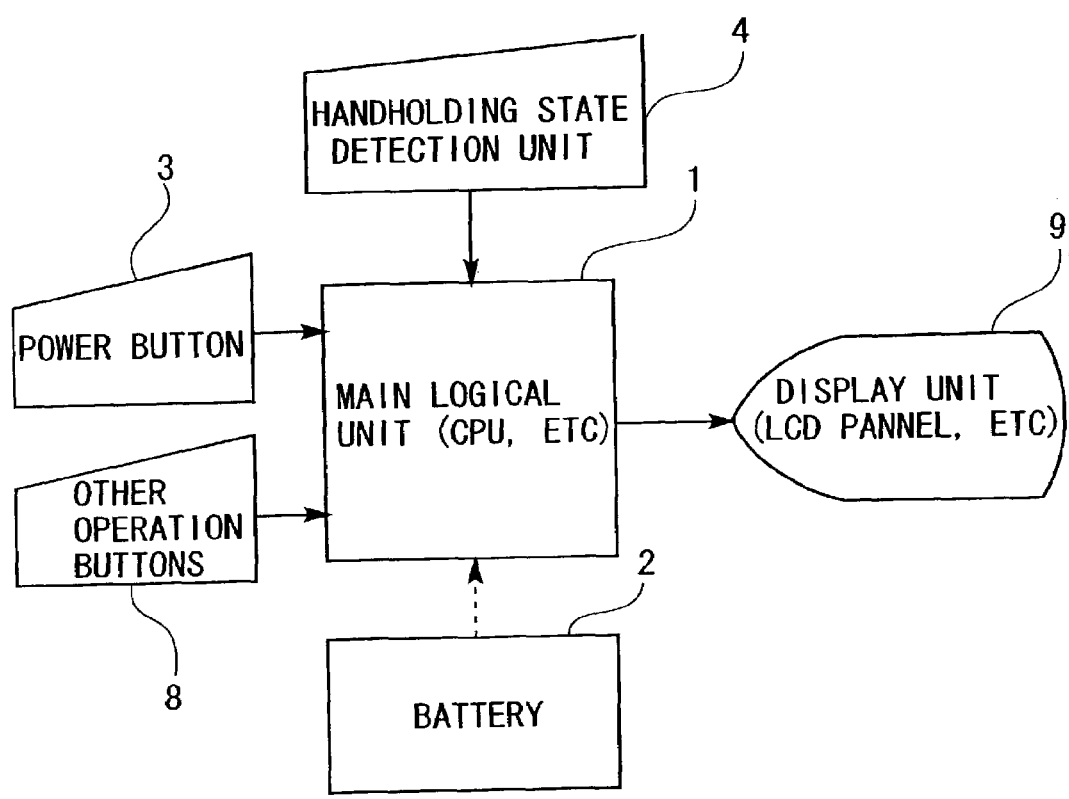
FIG. 2 is a block diagram showing a logical operation after starting up the mobile information device.
Figure 3:
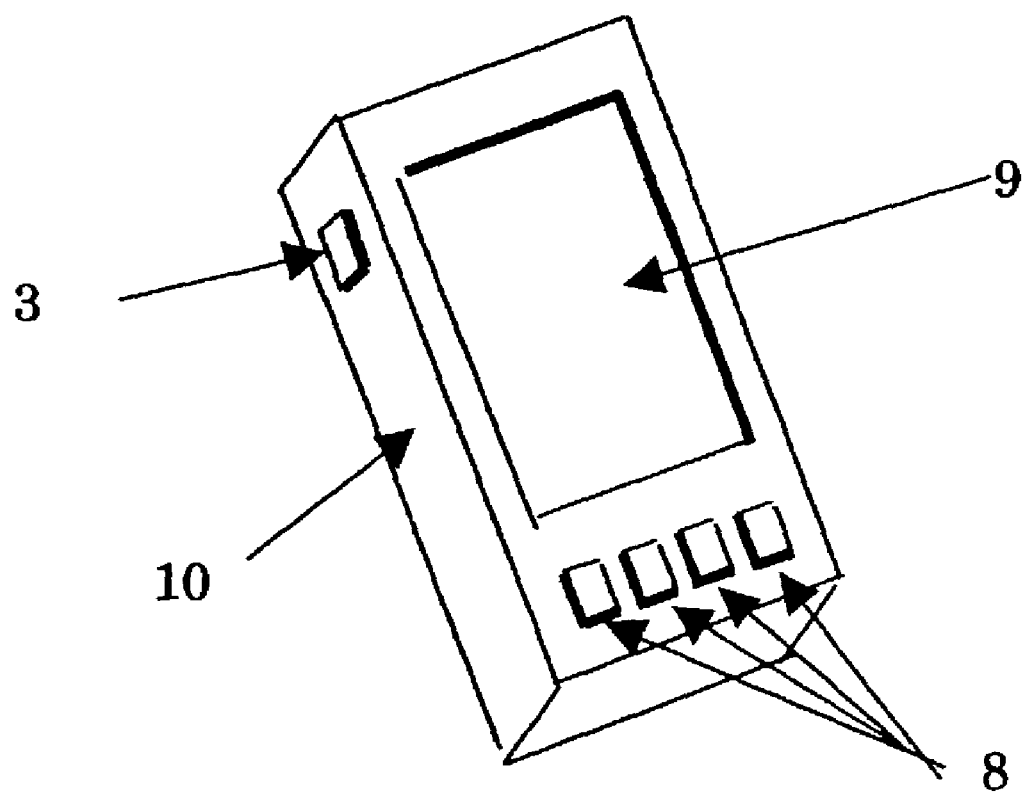
FIG. 3 is a view showing an external configuration of the mobile information device.
Figure 4:
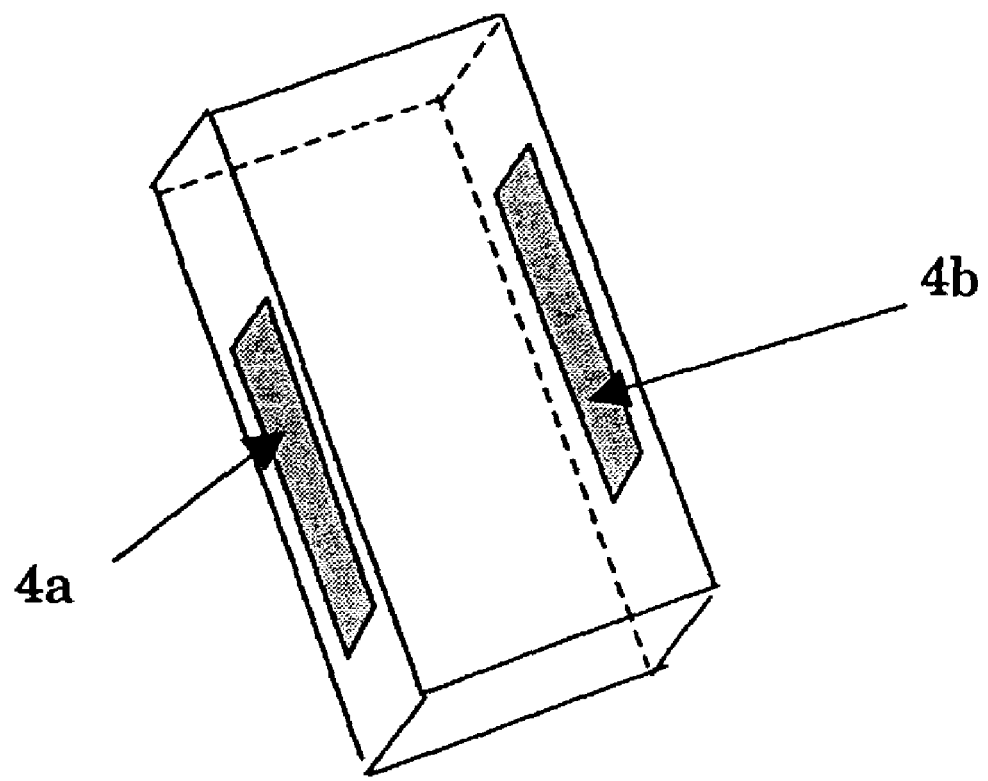
FIG. 4 is a view showing configurations of electrodes provided for detecting a handholding state.
Figure 5:
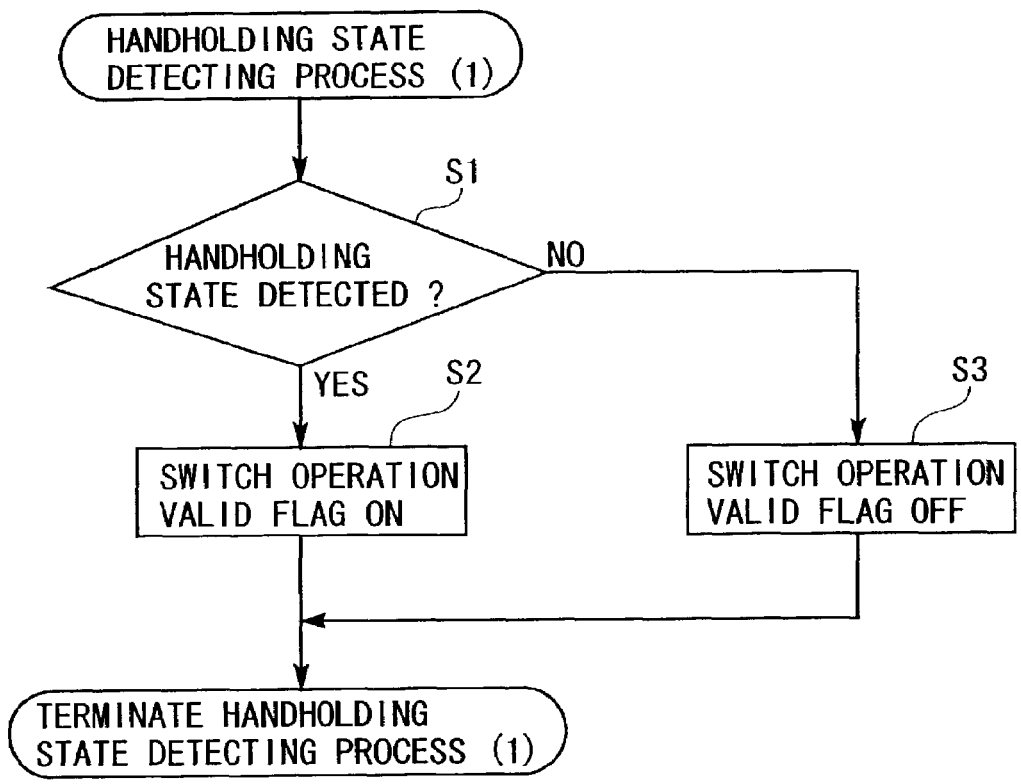
FIG. 5 is a flowchart showing a handholding state detecting process (1)
Figure 6:
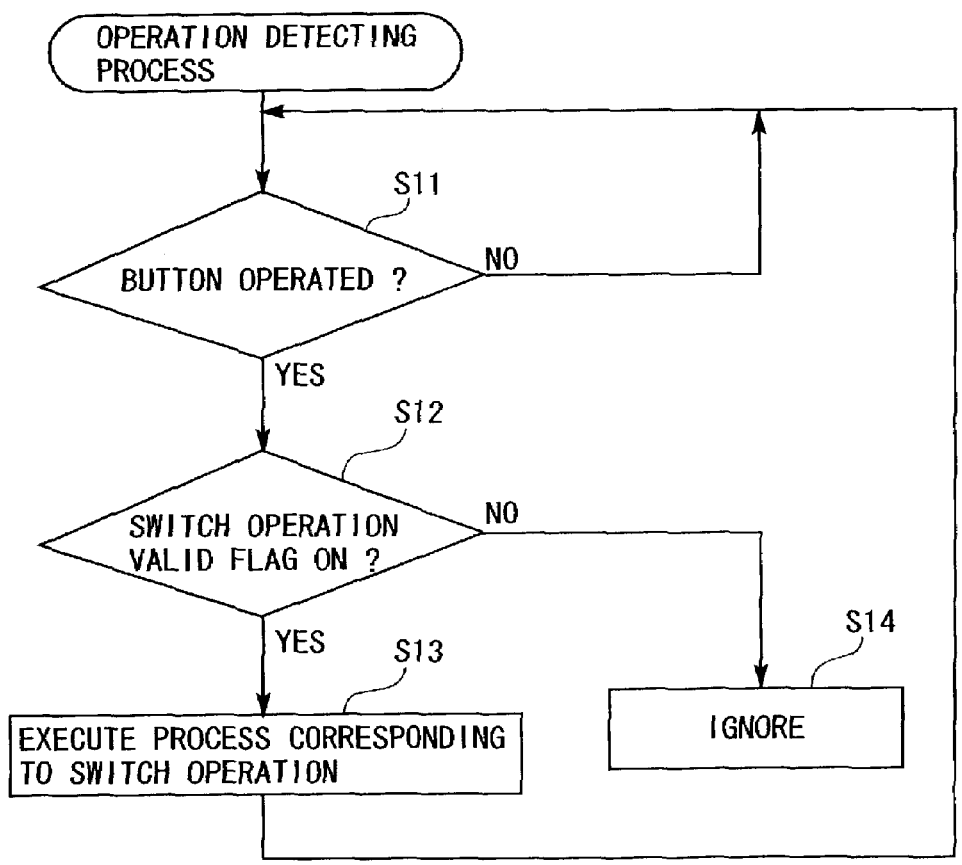
FIG. 6 is a flowchart showing an operation detecting process of detecting an operation by a user.

FIG. 1 is a block diagram showing a logical operation when starting up the mobile information device in the first embodiment. FIG. 2 is a block diagram showing a logical operation after the mobile information device has been started up. FIG. 3 is a view showing an external configuration of this mobile information device. FIG. 4 is a view showing an example of a layout of electrodes installed for detecting a handholding state of this mobile information device. FIG. 5 is a flowchart showing a handholding state detecting process (1) executed by a main logical unit 1. FIG. 6 is a flowchart showing an operation detecting process of detecting an operation of the user.

<Outline of Functions>

FIG. 1 shows the logical operation when starting up this mobile information device. The mobile information device includes, logically, the main logical unit 1 for controlling the device, a battery 2 for supplying electric power to this mobile information device, a power button 3 for inputting electric power to the mobile information device, a handholding state detection unit 4 for detecting a handholding state when the user holds the mobile information device in hand, and an AND circuit 5 that generates a logical product (AND) of an input signal transmitted from the power button 3 and an input signal from the handholding state detection unit 4.

Referring to FIG. 1, the main logical unit 1 is defined as a main control unit including a CPU, a memory etc, and operates with the battery 2 serving as the power source. This main logical unit 1 is started up when a boot signal 6 is inputted from the AND circuit 5.

The power button 3, when detecting an operation of the user, inputs an operation signal thereof to the AND circuit 5. The handholding state detection unit 4 detects whether the user handholds the device. A detected state is inputted to the AND circuit 5.

Then, the boot signal 6 is generated based on a press on the power button 3 and on an AND of the information indicating whether the handholding state detection unit 4 shows a handholding state, thereby starting up the main logical unit 1. Namely, the boot signal 6 is not generated from only one of the detection of the handholding state detection unit 4 and the press on the power button 3, with the result that the mobile information device is not started up.

Note that the handholding state detection unit 4 and the AND circuit 5 may be, though not illustrated in FIG. 1, supplied with the electricity through the power button 3. Based on such an architecture, upon switching ON the power button 3, to begin with, the handholding state detection unit 4 and the AND circuit 5 are supplied with the electricity, and, when the handholding state is detected in this state, it follows that the boot signal 6 is inputted to the main logical unit 1.

FIG. 2 is the block diagram showing the logical operation after the present mobile information device has been start up. The mobile information device provides, after being started up, the user with functions through the components (the main logical unit 1 for controlling the device, the battery 2 for supplying the electric power to the mobile information device, the power button 3 for inputting the electric power to mobile information device, the handholding state detection unit 4 for detecting the handholding state when the user holds the mobile information device in hand) illustrated in FIG. 1 and further, in addition, an operation button 8 and a display unit 9.

The main logical unit 1 includes the logical circuits such as the CPU, the memory etc, and the functions of the present mobile information device are actualized by hardware or software.

The operation button 8 is constructed of a plurality of button elements (which will hereinafter be generically referred to as the operation button 8) each pushed for starting a specified application program. Further, the power source of the mobile information device is, when in an OFF-state, switched ON upon pressing the operation button 8.

The display unit 9, which is, e.g., a liquid crystal display, an electroluminescence panel etc, displays the information outputted from the main logical unit 1 or the information of an input trough the operation button 8.

When the handholding state detection unit 4 indicates the handholding state, the main logical unit 1, upon detecting a press on the button element of the operation button 8, executes the application program corresponding to this pressed button element of the operation button 8. While on the other hand, when the handholding state detection unit 4 does not indicate the handholding state, the main logical unit 1, even when detecting the press on the power button 3 or on the operation button 8, ignores the detection thereof.

<Hardware Architecture>

FIG. 3 is the view showing the external configuration of the mobile information device. For example, a PDA may be exemplified as this type of mobile information device. The mobile information device in this embodiment is not, however, limited to the PDA. Namely, the present invention can be applied to, e.g., the mobile phone, PHS (Personal Handyphone System) etc.

As shown in FIG. 3, the present mobile information device includes the display unit 9 provided on an upper surface of a main body 10, the operation button 8 provided downwardly of the display unit 9, and the power button 3 provided on a left side surface, as viewed from the sheet surface, of the main body 10.

According to the conventional mobile information device, when the user presses the power button 3, the power source is switched ON, thereby starting up the system. Further, when the user presses the operation button 8 in a state where the system has been started up, a specified application program is started.

Generally, the power button 3 and the operation button 8 are provided on the surface of the main body 10, and hence there is a case where the system of the mobile information device might be started up by an external pressure for the duration of the user's carrying the mobile information device put into a bag or a pocket. The present mobile information device 1 incorporates a protection function for relieving such an unexpected operation.

FIG. 4 is the explanatory view showing an example of a handholding state detection function defined as a characteristic of the present mobile information device. FIG. 4 illustrates the mobile information device 1 including electrodes 4a, 4b attached to the two side surfaces thereof.

If the user handholds the present device in the left hand, it follows that the thumb touches the electrode 4a, and at least one of the index finger, the middle finger the third finger and the little finger touches the electrode 4b (the palm proximal to these fingers touches the electrodes depending on how the device is handheld).

According to the present mobile information device, a voltage is applied across between the electrodes 4a and 4b to flow a feeble current through a human body (fingers), and a circuit measures a value of electric resistance between the electrodes, thereby detecting whether the device is handheld or not.

<Operation>

FIG. 5 is the flowchart showing the handholding state detecting process (1) executed by the main logical unit 1 shown in FIG. 2. As already explained, the main logical unit 1 has the CPU, the memory etc., and the process in FIG. 5 is actualized as a program executed by the CPU. Further, this program is developed on the memory and repeatedly executed at a predetermined interval by the main logical unit 1.

In this process, at first, the main logical unit 1 judges whether the handholding state can be detected or not (S1). If the handholding state can be detected, the main logical unit 1 sets ON an operation valid flag (S2). This switch operation valid flag is ensured in, e.g., the memory within the main logical unit 1.

Whereas if the handholding state cannot be detected, the main logical unit 1 sets OFF the operation valid flag (S3). Thereafter, the main logical unit 1 terminates the process. The main logical unit 1 periodically executes the process described above and thus monitors the handholding state of the mobile information device.

FIG. 6 is the flowchart showing the operation detecting process in which the main logical unit 1 detects the user's operation. This process is also actualized as a program executed by the CPU, and this program is developed on the memory.

In this process, the main logical unit 1 monitors whether the operation button 8 is pressed or not (S11) Then, if the operation button 8 is pressed, the main logical unit 1 judges whether the witch operation valid flag is set ON (S12).

When judging that the switch operation valid flag is ON, the main logical unit 1 executes a process corresponding to an operation (which is called a switch operation) onto the operation button 8 (S13). For example, the application program corresponding to the button element of the operation button 8 is thereby started.

Whereas if the switch operation valid flag is OFF, the main logical unit 1 ignores the operation onto the operation button 8 (S14). Thereafter, the main logical unit 1 returns the control to S11 and monitors the operation onto the operation button 8.

As explained in FIG. 1, the present mobile information device is structured such that when the power button 3 is pressed in the state where the handholding detection unit 4 detects the handholding state, the system is started up but is not started up even by pressing the power button 3 in the state where the handholding detection unit 4 does not detect the handholding state.

Further, this mobile information device is also structures such that when the operation button 8 is pressed in the state where the handholding detection unit 4 detects the handholding state after starting up the system, a function corresponding to the pressed operation button 8 is provided (e.g., an application program is started) but is not provided even pressing the operation button 8 in the state where the handholding state detection unit 4 does not detect the handholding state.

Accordingly, unless the handholding state is detected, it does not happen that the system is started up even if an unexpected pressing is applied on the power button 3 for the duration of carrying the mobile information device. Further, there can be decreased an occurrence of such a situation that the application program is executed upon pressing the operation button 8 during its carry with the result that the predetermined function happens to be provided meaninglessly.

Modified Example

According to the embodiment discussed above, the handholding state is detected from the electric resistance between the electrodes 4a and 4b. The embodiment of the present invention is not limited to this construction. The handholding state may also be detected by a tilt sensor for detecting a tilt of the mobile information device by use of, for example, a distortion gauge or by a tilt sensor using a mercury switch. Further, the handholding state maybe detected by detecting a temperature of a human finger. Moreover, the handholding state may be detected by a pressure sensor for detecting a pressure on the main body 10 when handheld.

Second Embodiment

Figure 7:
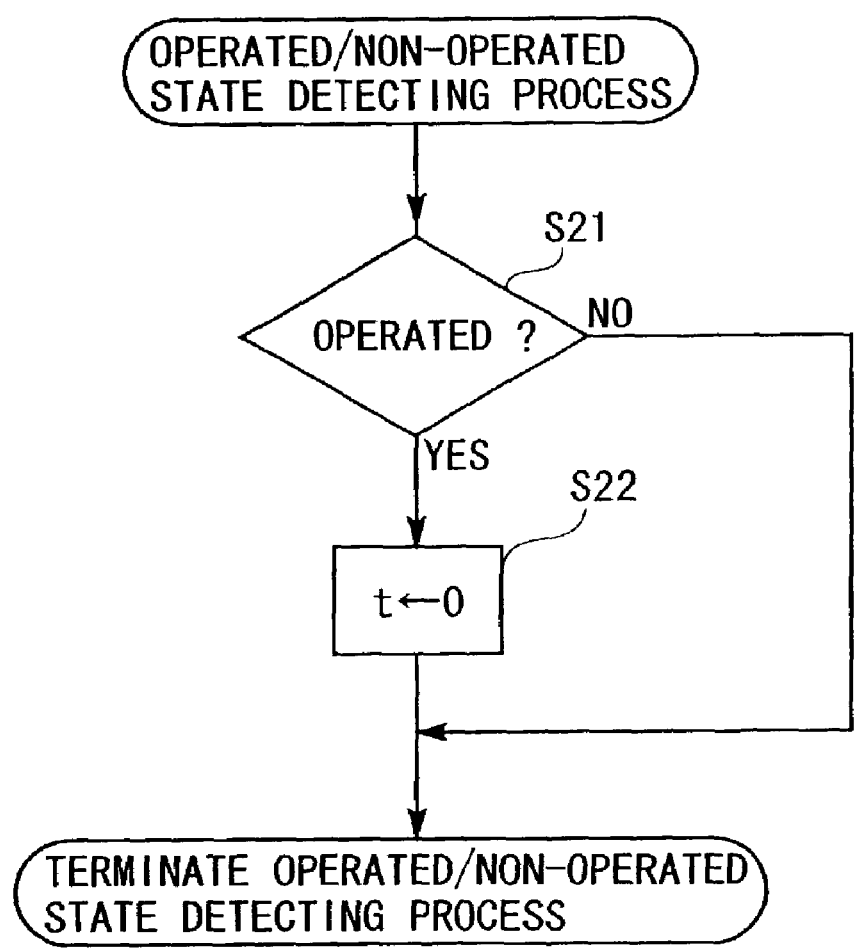
FIG. 7 is a flowchart showing an operated/non-operated state detecting process for detecting whether a user's operation is made or not in a second embodiment of the present invention.
Figure 8:
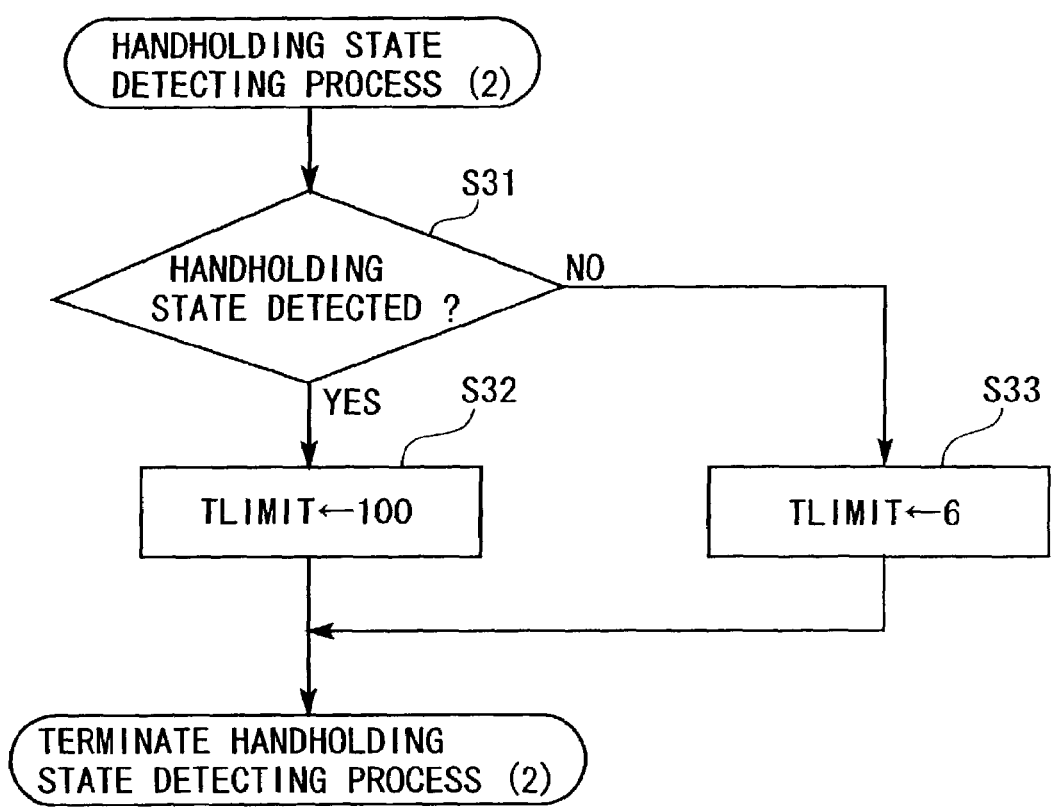
FIG. 8 is a flowchart showing a handholding state detecting process (2)
Figure 9:
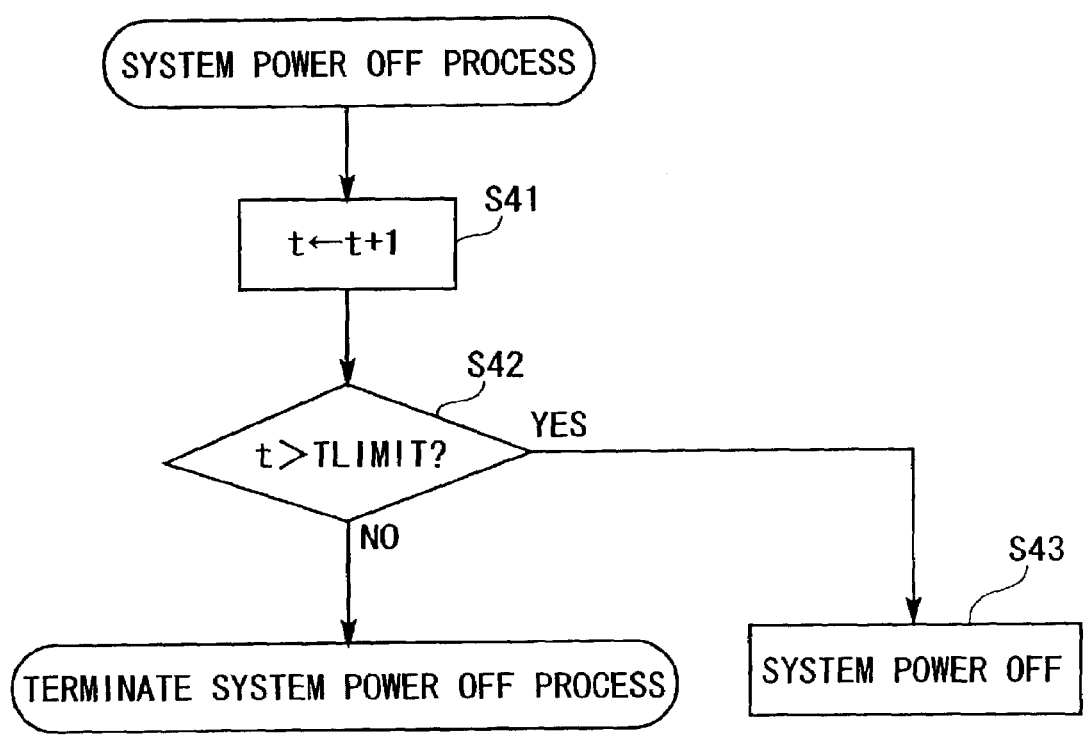
FIG. 9 is a flowchart showing a system power OFF process.

The mobile information device in a second embodiment of the present invention will hereinafter be described referring to FIGS. 7 through 9. FIG. 7 is a flowchart showing an operated/non-operated state detecting process for detecting whether a user's operation is made or not. FIG. 8 is a flowchart showing a handholding state detecting process (2). FIG. 9 is a flowchart showing a system power OFF process.

According to the first embodiment, when detecting the handholding state of the mobile information device, the operation of the power button 3 or the operation button 8 is validated. What will be discussed in the second embodiment is a function of automatically stopping the system if the operation of the operation button 8 is not detected for a predetermined period of time, and a function of adjusting a period till the system is automatically stopped by detecting whether the mobile information device is handheld or not.

Other configurations and operations are the same as those in the first embodiment. Then, the explanations of the same components are obvious from referring to FIGS. 1 through 6 and therefore herein omitted.

FIG. 7 is a flowchart showing the operated/non-operated state detecting process for detecting whether the user's operation is made or not. This process is triggered (started) at an interval of a predetermined time, thereby monitoring the user's operation of the operation button 8 etc.

Namely, when this process is triggered, the main logical unit 1 judges whether the user manipulates the operation button 8 etc (S21). Then, if the user's operation is detected, a time parameter t is cleared to 0 (S22). Note that the time parameter t is a parameter for counting a time till the system is automatically stopped and is set to 0 in an initial state. Accordingly, when the user's operation is detected, the time parameter is reset to the initial state.

FIG. 8 is the flowchart showing the handholding state detecting process (2). This process is triggered likewise at an interval of a predetermined time, thereby monitoring whether the user handholds the present mobile information device.

Namely, in this process, the main logical unit 1 at first judges whether the handholding state detection unit 4 detects the handholding state (S31). Then, when the handholding state detection unit 4 detects the user's handholding state, the main logical unit 1 sets a parameter TLIMIT to 100 (S32).

Whereas if the handholding state detection unit 4 can not detect the user's handholding state, the main logical unit 1 sets the parameter TLIMIT to 6 (S33). Thereafter, the main logical unit 1 terminates the handholding state detecting process (2).

FIG. 9 is the flowchart showing the system power OFF process. This process is triggered likewise at an interval of a predetermined time, and it is judged whether or not the power source of the present mobile information device is switched OFF. In this process, the main logical unit 1, to begin with, increments the time parameter t (S41).

Next, the main logical unit 1 judges whether or not a value of the time parameter t exceeds a value of the parameter TLIMIT (S42). Then, when the value of the time parameter t exceeds the value of the parameter TLIMIT, the main logical unit 1 switches OFF the power source of the system (S43) (a supply of the electric power from the battery 2 shown in FIG. 2 is stopped). Whereas if the value of the time parameter t does not exceed the value of the parameter TLIMIT, the main logical unit 1 directly terminates the process.

As discussed above, according to the present mobile information device, the predetermined time till the power source is automatically stopped is set based on judging whether the device is handheld or not. Further, if unable to detect the user's operation during the predetermined time (which will hereinafter be referred to as an idle time), the power source of the mobile information device is automatically stopped. For instance, if not in the handholding state, the mobile information device is automatically stopped within a comparatively short period of idle time. Whereas if in the handholding state, the mobile information device is not automatically stopped unless a longer period of idle time than not in the handholding state is detected. It is therefore possible to finely control the automatic stop of the mobile information device, corresponding to how the user utilizes the device.

For example, during the handholding state, the system of the mobile information device does not automatically stop for a comparatively long period of time even when the user does not manipulate. Hence, the system does not frequently stop in the handholding state, and the user has a less annoyance in operation of starting up the system. Moreover, when not in the handholding state, the system automatically stops within a comparatively short period of time, whereby the power can be saved.

Modified Example

According to the second embodiment discussed above, the value of the parameter TLIMIT is set to 100 or 6 depending on whether the mobile information device is handheld or not. The embodiment of the present invention is not limited to these values themselves as the values of the parameter TLIMIT. Namely, the value of TLIMIT may be determined within a range proper to the user. In this case, it is desirable that the value of TLIMIT be set to a value larger in the handholding state than not in the handholding state.

Other Modified Examples

As described above, in the mobile information device according to the first embodiment, whether or not the operation of the power switch 7, the operation button 8 etc is set valid is controlled based on judging whether the device is handheld or not. Further, the second embodiment has exemplified the case where the predetermined time up to the automatic stop of the power source is set depending on whether the mobile information device is handheld or not. The embodiment of the present invention is not, however, restricted to this processing example.

Figure 10:
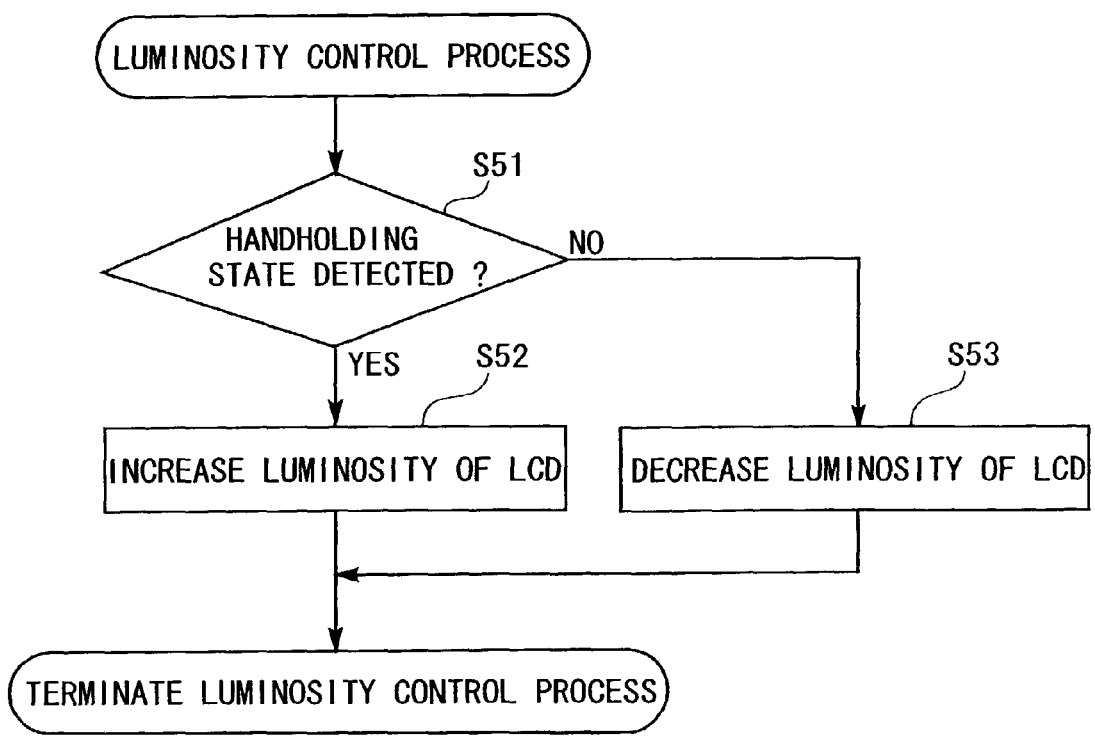
FIG. 10 is a flowchart showing a luminosity control process.

FIG. 10 is a flowchart showing a luminosity control process of controlling a luminosity of the display unit 9 (an LCD is herein assumed), depending on whether the mobile information device is handheld or not. This process can be actualized by a program executed at an interval of a predetermined time by the CPU of the main logical unit 1.

In this process, the main logical unit 1 at first judges whether the device is handheld or not (S51). Then, when the mobile information device is in the handholding state, the main logical unit 1 increases a luminosity of the LCD (the LCD is brightened) (S52). While on the other hand, when the mobile information device is not in the handholding state, the main logical unit 1 decreases the luminosity of the LCD (the LCD is darkened) (S53). Thereafter, the main logical unit 1 terminates the luminosity control process.

The present mobile information device is capable of controlling the luminosity of the LCD based on whether the device is handheld or not. Further, in this case, as in the second embodiment, the predetermined time for keeping the luminosity high is set based on whether the device is handheld or not, and, if the user does not manipulate for this predetermined time, the luminosity is decreased, whereby a more flexible adjustment can be made. For instance, in the handholding state, the predetermined time for keeping the luminosity high may be set longer.

In FIG. 10, the luminosity of the LCD is adjusted depending on when the mobile information device is handheld or not. Instead, for example, a power source for the luminosity of the LCD may be switched OFF when not in the handholding state. Further, in this case, as in the second embodiment, the predetermined time for keeping the luminosity is set based on whether the device is handheld or not, and, if the user does not manipulate for this predetermined time, the luminosity power source may be switched OFF.

Moreover, the embodiment of the present invention is not limited to the LCD described above. Namely, the present invention can be applied to a general category of display devices capable of controlling brightness of the display or the luminosity of the device, such as an electroluminescence panel, a CRT and so forth as substitutes for the LCD.

Figure 11:
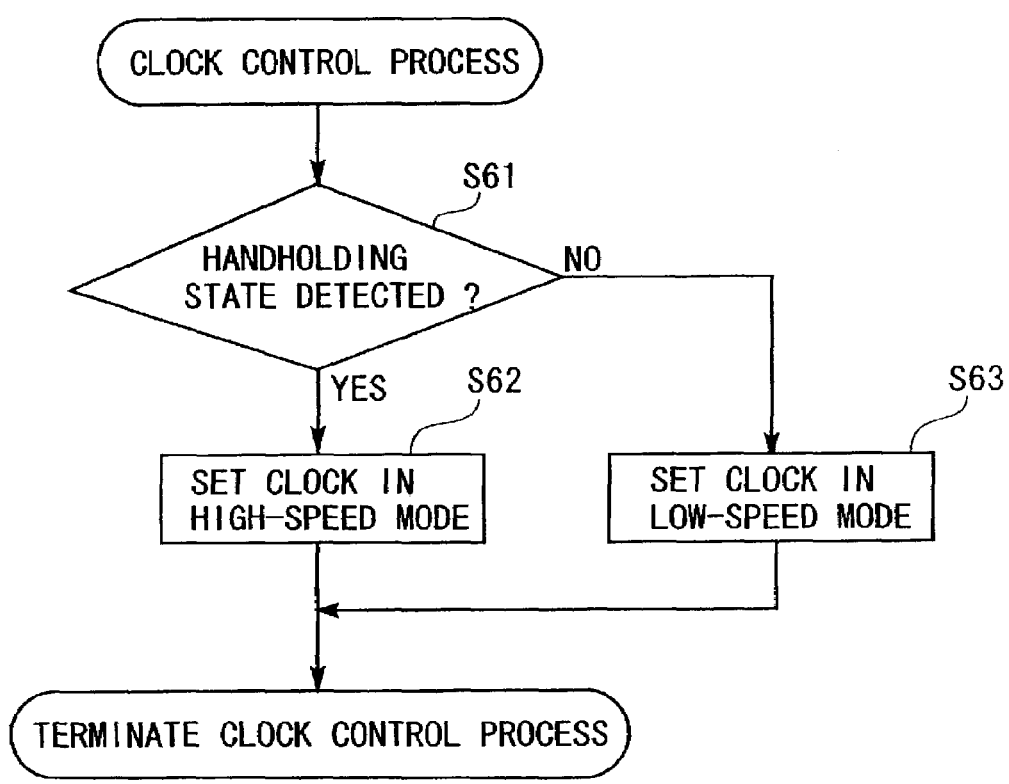
FIG. 11 is a flowchart showing a clock control process.

FIG. 11 is a flowchart showing a clock control process of controlling a clock cycle of the main logical unit 1 in accordance with whether the mobile information device is handheld or not. This process can be actualized by a program executed at a interval of a predetermined time by a CPU of the main logical unit 1 or by a control device cooperating with such a CPU.

In this process, the main control unit 1, to start with, judges whether the device is handheld or not (S61). Then, when the mobile information device is in the handholding state, the main control unit 1 sets the clock in a high-speed mode, e.g., 1 GHz (S62). Whereas if not handheld, the main control unit 1 sets the clock in a low-speed mode, e.g., 250 MHz (S63). Thereafter, the main logical unit 1 terminates the clock control process.

The present mobile information device is capable of controlling the clock cycle of the main logical unit 1 based on whether the device is handheld or not. Further, in this case, as in the second embodiment, the predetermined time for keeping the high-speed mode is set based on whether in the handholding state or not, and, if there is no occurrence of the user's operation during this predetermined time, a more flexible adjustment can be made by shifting to the low-speed mode. For instance, the predetermined time for keeping the high-speed mode may be set long in the handholding state.

Note that the high-speed mode may involve using a normal clock cycle of the CPU, while the low-speed mode may involve using a clock extended to a 4-fold cycle through a frequency dividing circuit such as a predetermined multiple counter, e.g., a quaternary counter in the case of this embodiment.

Figure 12:
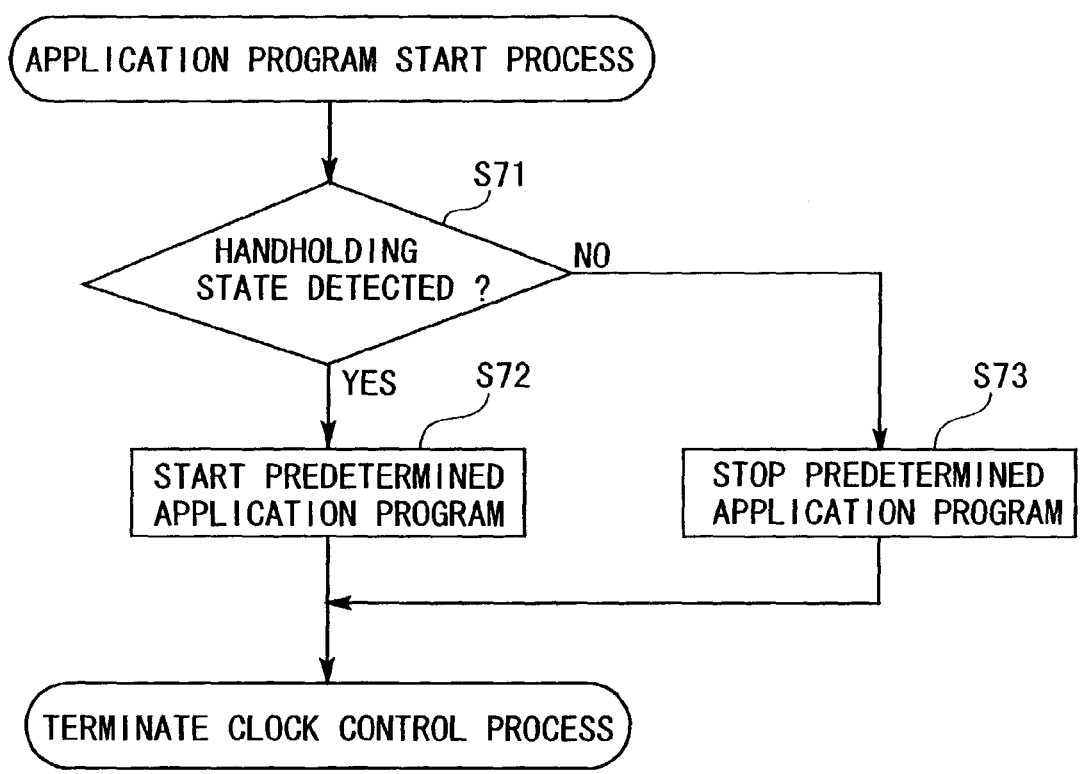
FIG. 12 is a flowchart showing an application program start process.

FIG. 12 is a flowchart showing an application program start process of starting or stopping the application program in the main logical unit 1, depending on whether the mobile information device is in the handholding state or not. This process can be actualized by a program executed at an interval of a predetermined time by the CPU of the main logical unit 1.

In this process, the main logical unit 1 at first judges whether the device is handheld (S71). Then, if the mobile information device is handheld, the main logical unit 1 starts a predetermined application program (S72). Whereas if not handheld, the main logical unit 1 stops the predetermined application program (S73). Thereafter, the main logical unit 1 terminates the application program start process.

The present mobile information device is capable of starting or stopping the specified application program based on whether the device is handheld or not. Further, in this case, as in the second embodiment, the predetermined time up to the start of the specified application program or the predetermined time up to the stop thereof may be set depending on whether the device is handheld or not. Then, if there is no occurrence of the user's operation for this predetermined time, a mode flexible adjustment can be performed by starting or stopping the application program.

<<Readable-by-Computer Storage Medium>>

A program for making a computer actualize any one of the functions described above may be recorded on a readable-by-computer storage medium. Then, the computer reads and executes the program on this storage medium, whereby the function thereof can be provided.

Herein, the readable-by-computer storage medium includes storage mediums capable of storing information such as data, programs, etc. electrically, magnetically, optically and mechanically or by chemical action, which can be all read by the computer. What is demountable out of the computer among those storage mediums may be, e.g., a flexible disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type storage mediums within the computer.

<<Data Communication Signal Embodied in Carrier Wave>>

Furthermore, the above program may be stored in the hard disk and the memory of the computer, and downloaded to other computers via communication media. In this case, the program is transmitted as data communication signals embodied in carrier waves via the communication media. Then, the computer downloaded with this program can be made to provide the function described above.

Herein, the communication media may be any one of cable communication mediums such as metallic cables including a coaxial cable and a twisted pair cable, optical communication cables, or wireless communication media such as satellite communications, ground wave wireless communications, etc.

Further, the carrier waves are electromagnetic waves for modulating the data communication signals, or the light. The carrier waves may, however, be DC signals. In this case, the data communication signal takes a base band waveform with no carrier wave. Accordingly, the data communication signal embodied in the carrier wave may be any one of a modulated broadband signal and an unmodulated base band signal (corresponding to a case of setting a DC signal having a voltage of 0 as a carrier wave).

What is claimed is:

1. A mobile information device comprising:
   a power source;
   an operation unit which detects a mobile device operation by the user,
   a detection unit which detects a user handholding state of the mobile device according to a probe current measurement based upon the user, when the mobile device is operated by the user according to the mobile device operation; and
   a control unit which controls such a transition point as to transit from a first state to a second state in accordance with whether the user handholding state is detected,
   wherein said control unit cuts off said power source when said operation unit does not detect the mobile device operation by the user for duration of a first period in the user handholding state, and also cuts off said power source when said operation unit does not detect the mobile device operation by the user for duration of a second period if not in the user handholding state.

2. A mobile information device comprising:
   a display unit controlling brightness of a display;
   an operation unit which detects a mobile device operation by a user;
   a detection unit which detects a user handholding state of the mobile device according to a probe current measurement based upon the user, when the mobile device is operated by the user according to the mobile device operation; and
   a control unit which controls the brightness of the display in accordance with whether the user handholding state is detected,
   wherein said control unit decreases the brightness of the display when said operation unit does not detect the mobile device operation by the user for duration of a first period in the user handholding state, and decreases the brightness of the display when said operation unit does not detect the mobile device operation by the user for duration of a second period if not in the user handholding state.

3. A mobile information device according to claim 2, wherein said control unit controls a period for keeping the brightness of the display in accordance with whether the user hand holding state is detected.

4. A mobile information device comprising:
   a power source;
   an operation unit which detects a mobile device operation by a user;
   a display unit supplied with electricity from said power source;
   a detection unit which detects a user handholding state of the mobile device according to a probe current measurement based upon the user, when the mobile device is operated by the user according to the mobile device operation; and a control unit which controls such a transition point as to transit from a first state to a second state in accordance with whether the user handholding state is detected, wherein the transition point is a point of cutting off said power source to stop the electric supply to said display unit, and wherein said control unit stops the electric supply to said display unit when said operation unit does not detect the mobile device operation by the user for duration of a first period in the user handholding state, and stops the electric supply to said display unit when said operation unit does not detect the mobile device operation by the user for duration of a second period if not in the user handholding state.

5. A mobile information device comprising:

an operation unit which detects a mobile device operation by a user;

a detection unit which detects a user handholding state of the mobile device according to a probe current measurement based upon the user, when the mobile device is operated by the user according to the mobile device operation; and a control unit which controls a performance speed in accordance with whether the user handholding state is detected, wherein said control unit decreases the performance speed when said operation unit does not detect the mobile device operation by the user for duration of a first period in the user handholding state, and decreases the performance speed when said operation unit does not detect the mobile device operation by the user for duration of a second period if not in the handholding state.

6. A mobile information device according to claim 5, wherein said control unit controls a period of keeping the performance speed in accordance with whether the user handholding state is detected.

7. A mobile information device comprising:

a processing unit which executes one or more processing programs;

an operation unit which detects a mobile device operation by a user;

a detection unit which detects a user handholding state of the mobile device according to a probe current measurement based upon the user, when the mobile device is operated by the user according to the mobile device operation; and a control unit which starts or terminates a specified processing program in said processing unit in accordance with whether the user handholding state is detected wherein said control unit starts or terminates the processing program when said operation unit does not detect the mobile device operation by the user for duration of a first period in the user handholding state, and starts or terminates the processing program when said operation unit does not detect the mobile device operation by the user for duration of a second period if not in the user hand holding state.

8. A mobile information device according to claim 7, wherein said control unit controls such a keeping period as to keep an executed state or a stopped state of the processing program in accordance with whether the user handholding state is detected.

9. A storage medium readable by a machine tangibly embodying a program of instructions executable by the machine to make a computer control a mobile information device including a power source, by:

detecting a mobile device operation by a user;

detecting a user handholding state of the mobile device according to a probe current measurement based upon the user, when said mobile information device is operated by the user according to the mobile device operation; and controlling a power source cut-off point as to stop an electric supply from said power source in accordance with whether the user handholding state is detected, wherein said controlling involves cutting off said power source when said operation unit does not detect the mobile device operation by the user for duration of a first period in the user handholding state, and also cutting off said power source when said operation unit does not detect the mobile device operation by the user for duration of a second period if not in the user handholding state.

10. A storage medium readable by a machine tangibly embodying a program of instructions executable by the machine to make a computer control a mobile information device including a display unit controlling brightness of a display, by:

detecting a mobile device operation by a user;

detecting a user handholding state of the mobile device according to a probe current measurement based upon the user, when said mobile information device is operated by the user according to the mobile device operation; and controlling the brightness of the display in accordance with whether the user handholding state is detected, wherein said controlling involves decreasing the brightness of the display when said operation unit does not detect the mobile device operation by the user for duration of a first period in the user handholding state, and also decreasing the brightness of the display when said operation unit does not detect the mobile device operation by the user for duration of a second period if not in the user handholding state.

11. A storage medium readable by a machine tangibly embodying a program according to claim 10, wherein said controlling involves controlling a period of keeping the brightness of the display in accordance with whether the user handholding state is detected.

12. A storage medium readable by a machine tangibly embodying a program of instructions executable by the machine to make a computer control a mobile information device including a display unit and a power source for supplying electricity to said display unit, by:

detecting a mobile device operation by a user;

detecting a user handholding state of the mobile device according to a probe current measurement based upon the user, when said mobile information device is operated by the user according to the mobile device operation; and controlling a power source cut-off point as to stop an electric supply to said display unit in accordance with whether the user handholding state is detected, wherein said controlling involves stopping the electric supply to said display unit when said operation unit does not detect the mobile device operation by the user for duration of a first period in the user handholding state, and also stopping the electric supply to said display unit when said operation unit does not detect the mobile device operation by the user for duration of a second period if not in the user handholding state.

13. A storage medium readable by a machine tangibly embodying a program of instructions executable by the machine to make a computer control a mobile information device including a performance unit controlling a performance speed, by:

detecting a mobile device operation by a user;

detecting a user handholding state of the mobile device according to a probe current measurement based upon the user, when said mobile information device is operated by the user according to the mobile device operation; and controlling the performance speed in accordance with whether the user handholding state is detected, wherein said control involves decreasing the performance speed when said operation unit does not detect the mobile device operation by the user for duration of a first period in the user handholding state, and also decreasing the performance speed when said operation unit does not detect the mobile device operation by the user for duration of a second period if not in the user handholding state.

14. A storage medium readable by a machine tangibly embodying a program according to claim 13, further comprising a period of keeping the performance speed in accordance with whether the user handholding state is detected.

15. A storage medium readable by a machine tangibly embodying a program of instructions executable by the machine to make a computer control a mobile information device including a processing unit for executing a processing program, by:

detecting a mobile device operation by a user;

detecting a user handholding state of the mobile device according to a probe current measurement based upon the user, when said mobile information device is operated by the user according to the mobile device operation; and controlling so as to start or terminate a specified processing program in said processing unit in accordance with whether the user handholding state is detected, wherein said controlling involves starting or terminating the processing program when said operation unit does not detect the mobile device operation by the user for duration of a first period in the user handholding state, and also starting or terminating the processing program when said operation unit does not detect the mobile device operation by the user for duration of a second period if not in the user handholding state.

16. A storage medium readable by a machine tangibly embodying a program according to claim 15, wherein said controlling involves controlling such a keeping period as to keep an executed state or stopped state of the processing program in accordance with whether the user handholding state is detected.

* * * * *

UNITED STATES PATENT AND TRADEMARK OFFICE
CERTIFICATE OF CORRECTION

| | |
|---|---|
| PATENT NO. | : 7,224,996 B2 |
| APPLICATION NO. | : 10/365393 |
| DATED | : May 29, 2007 |
| INVENTOR(S) | : Masayoshi Sakamoto |

It is certified that error appears in the above-identified patent and that said Letters Patent is hereby corrected as shown below:

Column 12, Line 19, change "user," to --user;--.

Column 12, Line 58, change "hand holding" to --handholding--.

Column 13, Line 62, change "hand holding" to --handholding--.

Signed and Sealed this

Sixteenth Day of October, 2007

JON W. DUDAS
*Director of the United States Patent and Trademark Office*